US012487666B2

(12) United States Patent
Saran et al.

(10) Patent No.: US 12,487,666 B2
(45) Date of Patent: Dec. 2, 2025

(54) AUTOCALIBRATION OF GAZE INDICATOR

(71) Applicant: Microsoft Technology Licensing, LLC, Redmond, WA (US)

(72) Inventors: Akanksha Saran, Jersey City, NJ (US); Jacob A. Alber, Sharon, MA (US); Danielle Karen Bragg, New York, NY (US); Cyril Zhang, New York, NY (US); John Carol Langford, Scarsdale, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 18/382,980

(22) Filed: Oct. 23, 2023

(65) Prior Publication Data
US 2025/0036196 A1    Jan. 30, 2025

Related U.S. Application Data

(60) Provisional application No. 63/529,276, filed on Jul. 27, 2023.

(51) Int. Cl.
*G06F 3/01*    (2006.01)
*G06F 3/023*    (2006.01)

(52) U.S. Cl.
CPC ........... *G06F 3/013* (2013.01); *G06F 3/0237* (2013.01)

(58) Field of Classification Search
CPC ............................. G06F 3/013; G06F 3/0237
See application file for complete search history.

(56) References Cited

U.S. PATENT DOCUMENTS

| 2015/0331485 | A1* | 11/2015 | Wilairat | G02B 27/0093 |
| | | | | 345/156 |
| 2017/0123492 | A1* | 5/2017 | Marggraff | H04L 63/0861 |
| 2019/0034057 | A1* | 1/2019 | Rudchenko | G06F 3/04817 |
| 2019/0265788 | A1 | 8/2019 | Yosha | |
| 2023/0107040 | A1 | 4/2023 | Alcaide | |
| 2023/0333642 | A1* | 10/2023 | Chimalamarri | G06F 3/013 |

FOREIGN PATENT DOCUMENTS

WO    2019144196 A1    8/2019

OTHER PUBLICATIONS

International Search Report and Written Opinion received for PCT Application No. PCT/US2024/037485, Nov. 8, 2024, 15 pages.

* cited by examiner

*Primary Examiner* — Mishawn N. Hunter
(74) *Attorney, Agent, or Firm* — Schwegman Lundberg & Woessner, P.A.

(57) ABSTRACT

Generally discussed herein are devices, systems, and methods for calibration of a gaze indicator. A method can include receiving gaze tracker output data that indicates a gaze location on a display at which a user is gazing, determining an expected gaze location to which the user is expected to gaze after the gaze location, receiving further gaze tracker output data that indicates a subsequent gaze location on the display at which the user is gazing, and adjusting, based on the subsequent gaze location and the expected gaze location, a location of a visual gaze indicator on the display.

19 Claims, 8 Drawing Sheets

AUTOCALIBRATION OF GAZE INDICATOR

RELATED APPLICATION

This application claims the benefit of priority to U.S. Provisional Patent Application No. 63/529,276, titled "Autocalibration of Gaze Indicator", and filed on Jul. 27, 2023, which is incorporated herein by reference in its entirety.

BACKGROUND

Calibration is an important aspect of eye tracking systems. Eye tracking systems map gaze points to locations in a field of view (FOV), such as a display. The eye tracker systems rely on accurate data from eye trackers. However, calibration of the eye trackers can be time-consuming, intrusive, and sometimes the calibration needs to be repeated frequently to maintain accuracy. This is because eye-tracking performance can degrade over time due to factors such as user movement or changes in ambient lighting, among other factors. Various calibration methods have been proposed to improve the accuracy and user experience of eye tracking devices. Traditional calibration techniques involve the user following a series of on-screen targets, such as dots or markers, while the eye tracker records the gaze data of the user. These methods, while effective, can be time-consuming and uncomfortable for some users, particularly those with motor impairments.

A technique for eye tracker calibration can include using dynamic fiducial markers placed on the screen. This calibration technique gathers a large array of calibration points in a fast and unsupervised manner. While this approach can cover more areas of a screen, as compared to a 9-point calibration system, and this approach can account for natural variances in the way different individuals' eyes track moving objects, this approach relies on the availability of specific markers for explicit user calibration.

A self-calibrating approach for eye trackers can be based on a computational model of bottom-up visual saliency. The computational model of bottom-up visual saliency assumes that the user's gaze fixations always lie inside a small cluster of salient regions in the egocentric view of the user. While this approach is implicitly adaptive and leverages natural junctures of the user's visual view on a screen or the 3D environment, it is data intensive for accurate autocalibration.

Adaptive techniques for gaze typing aim to improve the efficiency and user experience of gaze-based text entry by dynamically adjusting system parameters based on the user's performance and gaze behavior. To enable widespread adoption of gaze typing technologies for augmented reality (AR) applications, a prior technique emphasizes a need to create gaze typing that proactively adapts dwell time instead of retrospectively reacting to user fatigue. This enables users to type short texts at their peak performance and economically use cognitive resources for long texts. Another technique, a cascading dwell technique, automatically adjusts a dwell time for gaze-based input based on the user's performance. This approach has been shown to improve typing speeds and reduce errors in text entry tasks, highlighting the importance of dynamic adjustments in gaze-based input systems.

Another technique uses an adaptive gaze typing system that develops a computational model of the control of eye movements in gaze-based selection. This technique formulates the model as an optimal sequential planning problem bounded by the limits of the human visual and motor systems and use reinforcement learning to approximate optimal solutions for a number of fixations and duration required to make a gaze-based selection.

Another adaptive learning approach adaptively calibrates a red, green, blue (RGB)-based eye tracker used for display screens. This approach assumes the user can provide click-based feedback in the learning system in the form of backspaces activated on a physical keyboard/device.

SUMMARY

A device, system, method, and computer-readable medium are configured for autocalibration of a visual eye tracker indicator.

A method can include receiving gaze tracker output data that indicates a gaze location on a display at which a user is gazing. The method can further include determining an expected dwell region to which the user is expected to gaze after the gaze location. The method can further include receiving further gaze tracker output data that indicates a subsequent gaze location on the display at which the user is gazing. The method can further include calibrating, based on the subsequent gaze location and the expected dwell region, a location of a visual gaze indicator on the display resulting in a calibrated visual gaze indicator.

The expected dwell region can be a range of pixels. The gaze location can be a pixel. The expected dwell region can be in an output display region of the display. The gaze location can be in a virtual keyboard region of the display The method can further include responsive to determining the subsequent gaze location is within the expected dwell region and a typing speed is above a specified threshold characters per unit time decreasing a number of pixels in the range of pixels. The method can further include responsive to determining the subsequent gaze location is not within the expected dwell region and a typing speed is less than a specified threshold characters per unit time increasing the number of pixels in the range of pixels.

The method can further include receiving, from a predictive text engine, a predicted next character. The expected dwell region can be at a location of a virtual button corresponding to the predicted next character in a virtual keyboard region of the display. Receiving, from the predictive engine, can further include receiving a confidence associated with the predicted next character and the expected dwell region is at the location of the virtual button corresponding to the predicted next character only if the confidence is greater than a specified threshold.

The method can further include determining the gaze on the subsequent gaze location is sustained for a threshold amount of time. Calibrating can occur responsive to determining the gaze on the subsequent gaze location is sustained for the threshold amount of time.

A system can include a display device and a gaze tracker configured to generate output data that indicates a gaze location on the display at which a user is gazing. The system can include a user interface that causes a virtual keyboard and an output display region to be displayed concurrently on the display device. The system can further include an autocalibration application configured to receive the output data and determine an expected dwell region to which the user is expected to gaze after the gaze location. The autocalibration application can be further configured to receive further output data from the gaze tracker that indicates a subsequent gaze location on the display at which the user is gazing. The autocalibration application can be further configured to calibrate, based on the further output data and the expected dwell region, a location of a visual gaze indicator provided by the user interface on the display resulting in a calibrated visual gaze indicator.

The autocalibration application can be further configured to determine the gaze on the subsequent gaze location is sustained for a threshold amount of time. The calibrating can occur responsive to determining the gaze on the subsequent gaze location is sustained for the threshold amount of time.

The system can further include a predictive text engine configured to generate a predicted next character. The autocalibration application can be further configured to receive the predicted next character. The expected dwell region can be at a location of a virtual button corresponding to the predicted next character in a virtual keyboard region of the display. The expected dwell region can be in the output display region of the display and the gaze location is in the virtual keyboard region of the display.

The autocalibration application can further configured to, responsive to determining the subsequent gaze location is within the expected dwell region, decreasing a number of pixels in a range of pixels covered by the expected dwell region. The autocalibration application can be further configured to, responsive to determining the subsequent gaze location is not within the expected dwell region increasing a number of pixels in a range of pixels covered by the expected dwell region.

DETAILED DESCRIPTION

Figure 1:
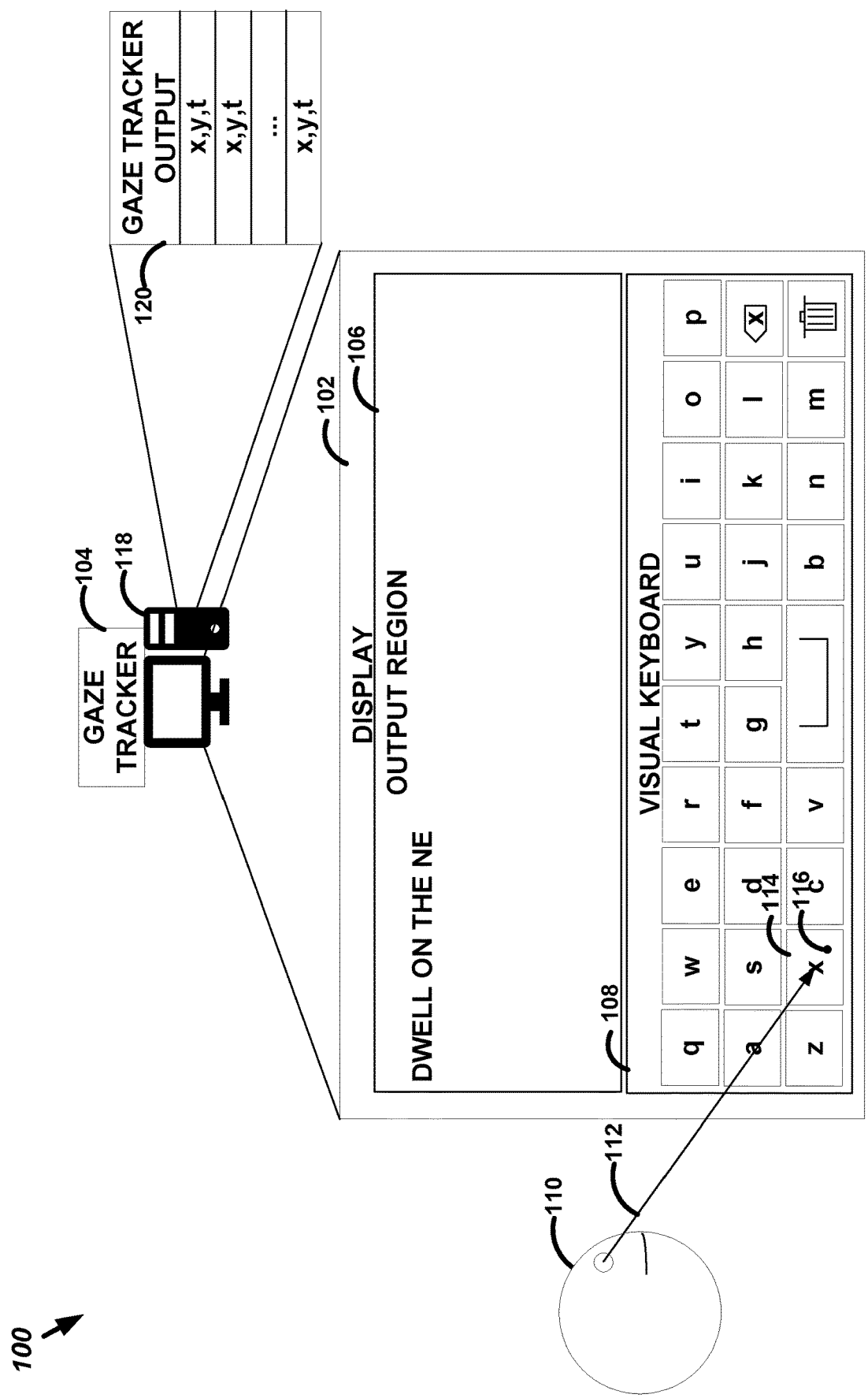
FIGS. 1 and 2 illustrate, by way of example, respective diagrams of an embodiment of a system for autocalibrating a gaze indicator.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Eye tracking technology has emerged as a valuable tool in a variety of applications, including accessibility, augmented reality (AR), virtual reality (VR), and even gaming. Eye tracking has been particularly beneficial for individuals with motor impairments who rely on gaze-based input methods for communication and device control. Gaze typing, a common use case of eye tracking, enables users to input text by looking at keys of an on-screen keyboard, thereby offering a hands-free and non-vocal method of communication. However, the accuracy and efficiency of gaze typing depends on the calibration of the eye tracker. Calibration, in the context of gaze typing, is a process that establishes a relationship between a target of a gaze and the corresponding screen coordinates. Calibration can be time-consuming, tedious, and in some cases, uncomfortable for the user.

Head movements, eye fatigue, changes in lighting and other environmental conditions, and hardware inconsistencies lead to miscalibration over time. Miscalibration can significantly impact the performance of gaze typing. The performance of gaze typing technologies is exacerbated for users with motor impairments. These users may have difficulty maintaining a stable head position or participating in traditional calibration procedures. Reportedly, amyotrophic lateral sclerosis (ALS) users recalibrate their eye trackers more than 15-20 times each day. Consequently, there is a pressing need for calibration methods that are not only accurate but also user-friendly and adaptive to changes in the user condition and gaze typing environment.

Miscalibration of gaze tracking devices and the resulting need for repeated calibrations are a significant barrier to use of gaze typing technologies. As gaze typing devices miscalibrate, people tend to auto-correct by gazing at neighboring targets, which makes it difficult to detect miscalibration from eye signals.

To address the miscalibration issues, an eye tracker can be autocalibrated during gaze typing. In gaze tracking, the eyes are used as both input (i.e. reading) and output (i.e. typing) signals. Auto-correction by a user (when a user detects a miscalibration and compensates their gaze to account for the miscalibration) only occurs when eye gaze is functioning as output. Input eye gaze signals do not suffer from the same auto-correction problem because text on a screen is not dependent on the gaze of the user. Thus, when a user is reading what they have typed, the user gaze can help systems detect the miscalibration offset and enable autocalibration.

An autocalibrated gaze tracker can identify a location on a display (by pixel or a range of pixels) at which a typed character is to be displayed. The autocalibrated gaze tracker can determine a location a gaze tracker indicates the user is looking at. Since the user is expected to look to see that the typed character is displayed correctly, a difference between the location provided by the gaze tracker and the location at which the typed character is to be displayed provides an indication as to the calibration of the gaze tracker. The autocalibrated gaze tracker can adjust a location of a gaze indicator (a graphical component visible on the display that indicates a location at which the user is gazing) to account for the miscalibration.

Additionally, or alternatively, a predictive text engine can predict a next character to be typed by the user. The autocalibrated gaze tracker can determine a location of the next character to be typed on a virtual keyboard on the display. Since the user is expected to dwell on that character soon, a difference between the location provided by the gaze tracker and the location at which the character is displayed provides an indication as to the calibration of the gaze tracker. The autocalibrated gaze tracker can adjust a location of the gaze indicator to account for the miscalibration. The autocalibrated gaze tracker thus operates as a sort of man-in-the-middle that detects and compensates for miscalibration automatically.

To demonstrate the potential for this type of approach, an auto-calibration system for gaze typing was built and studied with 19 able-bodied participants. Results from the study suggest that such an implicit approach to autocalibration can significantly improve typing speed and overall user experience for gaze typing interfaces. Insights from this work are applicable to a broad set of gaze tracking technologies and may help create more seamless user experiences in a variety of domains.

Autocalibrated gaze tracking is an approach to calibrating eye trackers during gaze typing. Autocalibrated gaze tracking can leverage differences in gaze behavior during reading versus typing. When typing, users compensate and autocorrect for miscalibration in eye tracking software by purposefully glancing at adjacent keys to activate a key of interest. While such behavior adds additional cognitive load for users, it can enable them to type despite some miscalibration and avoid performing a calibration. Such behavior also confounds the detection of miscalibration or a struggle from the user's gaze behavior. However, when users read the typed text, they do not compensate for miscalibration, providing a signal for detecting the calibration offset. Autocalibrated gaze tracking can leverage this insight to track reading behavior and compare their gaze during readying versus typing to the location of typed characters on the screen to estimate the miscalibration amount and direction. An improved technique to gaze typingO aims to improve the gaze typing experience by continuously adjusting the calibration in real-time based on the user's gaze behavior, thereby reducing the need for manual recalibration and offering a more natural and efficient interaction. Autocalibrated gaze tracking can benefit a wide range of users, including those with motor impairments who use gaze keyboards for everyday communication, with amyotrophic lateral sclerosis (ALS), and others who use gaze typing systems for extended periods, such as gamers and virtual/augmented reality headset users.

The proposed autocalibrated gaze tracking leverages natural elements of a user interface (UI), such as a text box displaying typed text, which enables implicit calibration (without the user being aware that it is taking place). In comparison to a computational model of bottom-up visual saliency for visual scenes, autocalibrated gaze tracking relies on natural elements of the UI (even when the visual display does not have particularly salient regions such as a visual keyboard). Further, autocalibrated gaze tracking has potential to autocalibrate quickly, even with one reading attempt. While some of the prior approaches to gaze calibration present adaptive learning based solutions for dwell-time customization, autocalibrated gaze tracking leverages a technique which adaptively corrects for miscalibration of an eye tracker during gaze typing. Also, in comparison to some prior gaze calibration techniques, autocalibrated gaze tracking can rely only on feedback from the gaze trajectory available on the gaze application UI and does not use any external hardware coupled to the computer beyond the eye tracker.

Figure 2:
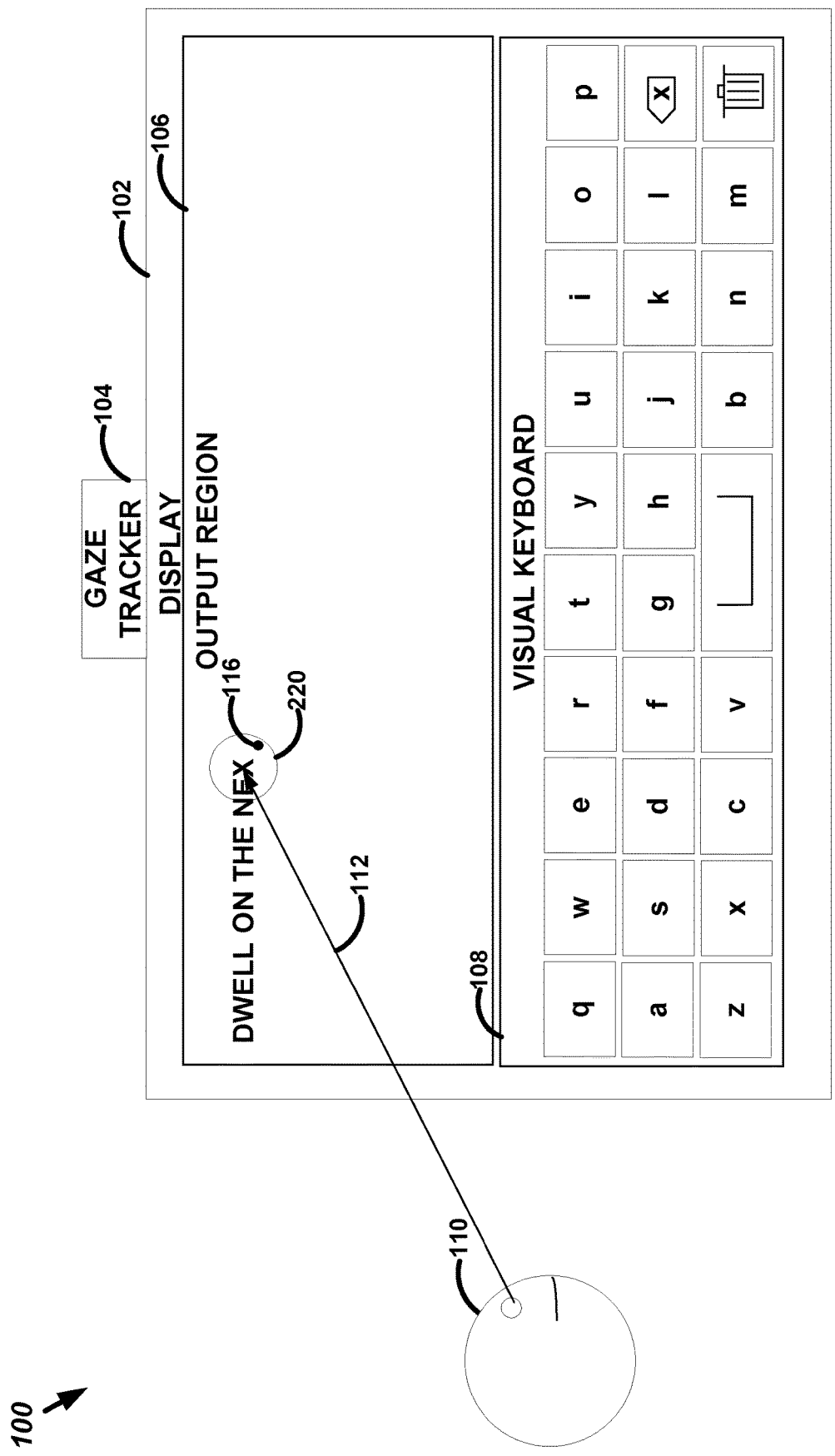

FIGS. 1 and 2 illustrate, by way of example, respective diagrams of an embodiment of a system 100 for autocalibrating a gaze indicator. The system 100 includes a display 102 and a gaze tracker 104 coupled to a computer 118. The computer 118 executes an application that cause the display 102 to provide a UI for gaze typing. Gaze typing provides functionality for a user to type using just their eyes. The UI for gaze typing includes an output region 106 and a visual keyboard 108. The gaze tracker 104 monitors a gaze (indicated by arrow 112) of a user 110 and provides (x, y) coordinates that indicate respective locations on the display 102 at which the user is predicted to be gazing. The gaze tracker output 120 can also include a time or can otherwise be associated with a time (e.g., a relative time or a computer time). Temporally ordered gaze tracker output 120 forms a series of locations (e.g., pixels of the display 102) at which the user 110 is predicted to be gazing.

In the example of FIG. 1, the visual keyboard 108 contains multiple visible representations of keys that can be selected by user gaze. In one example, the user is gazing at the letter "x" on a virtual button 114 of the virtual keyboard 108 in an attempt to type the word "next." After the user is detected to be gazing at the letter "x" for a specified dwell time, the letter "x" is displayed in the output region 106 of the display 102. In typical use, the user 110 will type or otherwise alter the output displayed in the output region 106 by dwelling on a virtual button on the virtual keyboard 108. Then the user 110 will gaze at the output region 106 to observe how their gaze altered the output. More specifically, the user 110 tends to gaze at a next location in the output region 106 affected by dwelling on the virtual button. In the example of FIG. 1, the location is to the right of the "E" of "NE" in the output region 106 is where the letter "X" (or other inidicia) will appear when typed correctly by the user.

While the gaze tracker 104 can be quite accurate at conveying the location at which the user 110 is gazing, the gaze tracker output 120 can be inaccurate due to the user moving their head, lighting conditions, or other factors. The gaze tracker output 120 can thus drift or otherwise be inaccurate. A gaze tracker output 120 inaccuracy and amount of the inaccuracy can be determined by comparing the gaze tracker output 120 when the user 110 is gazing at the output region to the 106 to the actual, deterministic location of the output that is expected to be the target of the gaze. Additionally or alternatively, the next location may be selected in a different manner, such as by predicting a next letter the user 110 is likely to select, as some users may desire to select all the letters in a word prior to checking the output 120.

The typical user will look at the output region 106 after dwelling on a virtual button of the virtual keyboard 108. Because the display in the output region 106 is deterministic, an application can know exactly which pixels of the display 102 will be used to provide the visualization caused by dwelling on the virtual button. Thus, the exact location of where the user is expected to dwell next is known. By comparing the exact location of the output to the gaze tracker output 120 for the corresponding time, an amount of miscalibration can be detected, such as by software. A location of an indicator 116 that provides a visual indication of the gaze tracker output 120 can be adjusted in accord with the amount of miscalibration that is detected. Assume that the gaze tracker output 120 is (x1, y1) for the time during which the user 110 is dwelling on the virtual button 114 and the miscalibration is determined to be ($\Delta x$, $\Delta y$) based on the user 110 dwelling in the output region 106 immediately after dwelling on the virtual button 114. The miscalibration can be determined, in some instances, only if a key is successfully typed on the display (in this case the letter "X"). The software of the computer 118 can adjust the indicator 116 to be displayed at a location corresponding to (x1-$\Delta x$, y1-$\Delta y$). In the example of FIG. 1, the indicator 116 is detected as being off-center (to the right and below the center) of the virtual button 114. While the gaze tracker output 120 as discussed is two-dimensional (2D), it is not limited to just 2D. The gaze tracker output 120 can be three-dimensional (3D) such as for AR, VR, or other applications that include depth.

FIG. 2 illustrates, by way of example, a diagram of the system 100 (without the computer for simple explanation purposes) immediately after the user 110 adjusts their gaze away from the virtual button 114. In the example of FIG. 2, the user 110 has moved their gaze to the output region 106 and to a location at which the character "x" is expected to be displayed. An expected dwell region 220 indicates an area in which the user 110 is expected to dwell after dwelling on the character "x". The application can assume that the user 110 intends to gaze at the center of the expected dwell region 220, determine a difference (e.g., in terms of a number of pixels in the x direction and the y direction) between the gaze tracker output 120 and the center (or other location) within the expected dwell region 220. The application can then adjust the location of the indicator 116 on the display 102 to properly reflect where the user 110 was actually gazing. The application can thus automatically calibrate the gaze tracker output 120 to meet user expectations and provide a more seamless gaze typing user experience.

The expected dwell region 220, the number of calibrations, or other aspect of the UI can be adjusted based on a speed at which a user is typing. If the user is typing slower, the calibrations can be performed more often than if a user is typing faster (in which case it is likely the system is already well-calibrated).

A moving average of the difference between gaze tracker output 120 can be used as the amount of pixels to move the indicator 116. The moving average can be determined using an integration technique that does not require maintaining a buffer of a history of the averages or a history of the differences.

Figure 3:
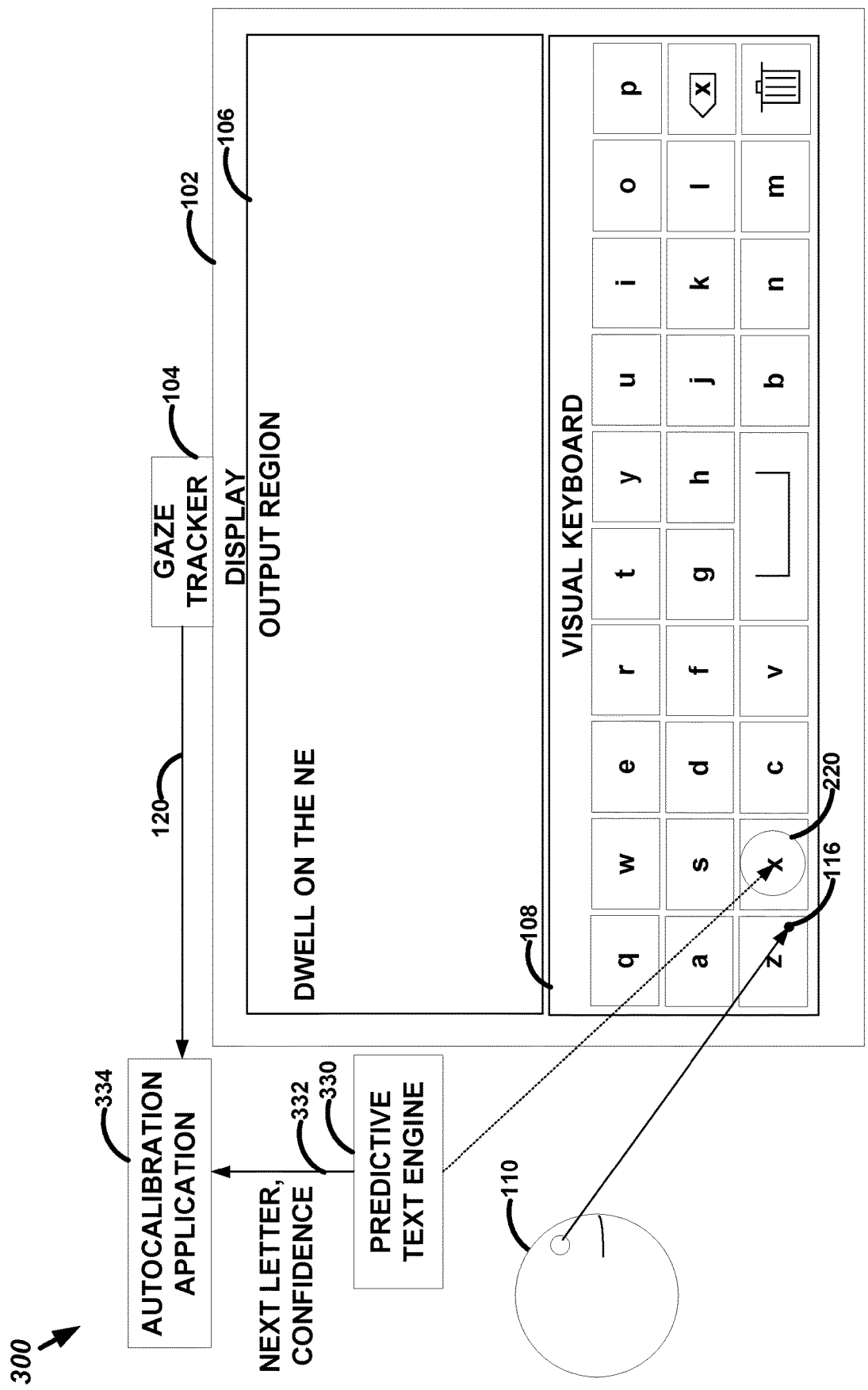
FIG. 3 illustrates, by way of example, a diagram of an embodiment of an autocalibration system that includes a predictive text engine.

FIG. 3 illustrates, by way of example, a diagram of an embodiment of an autocalibration system that includes a predictive text engine 330. In some instances, an autocalibration application 334 can execute or receive output from a predictive text engine 332. The predictive text engine 332 can predict, based on recent typed text, a next character or characters to be typed by the gaze of the user 110. The predictive text engine 330 can include T9, iTap, eZiText, LetterWise, WordWise, or the like. The predictive text engine 330 can implement a machine learning (ML) algorithm to determine a next character or word being typed by a user. Output of the predictive text engine 330 can indicate a letter, word, or the like, along with a confidence. The confidence can indicate how likely the letter or word is correct. If the confidence is sufficiently high (e.g., above a specified threshold like 50%, 75%, 80%, 90%, 95%, a greater threshold or some threshold therebetween), the autocalibration application 334 can assume that the user 110 intends to gaze type the next letter indicated by the predictive text engine 330.

If a prediction, from the predictive text engine 332, has a sufficiently high confidence, then the expected dwell region 220 can be at a location in the visual keyboard 108 corresponding to a next predicted character. The next predicted character, in the example of FIG. 3 is "x". The calibration can then be performed based on a gaze in the visual keyboard region 108. The application 334 can know which pixels of the display 102 correspond to each of the virtual buttons in the visual keyboard 108. The knowledge of the actual location of the virtual button and the gaze tracker output 120 can be leveraged to determine the offset for calibration. The difference between the center location (or other location) of the virtual button and the gaze tracker output 120 can be used in the running average (or other determination) of the offset. In the example of FIG. 3, the indicator 116 is illustrated as being to the left of the expected dwell region 220 and can thus indicate that the eye tracker is miscalibrated and the user 110 could be compensating their gaze to account for miscalibration.

Figure 4:
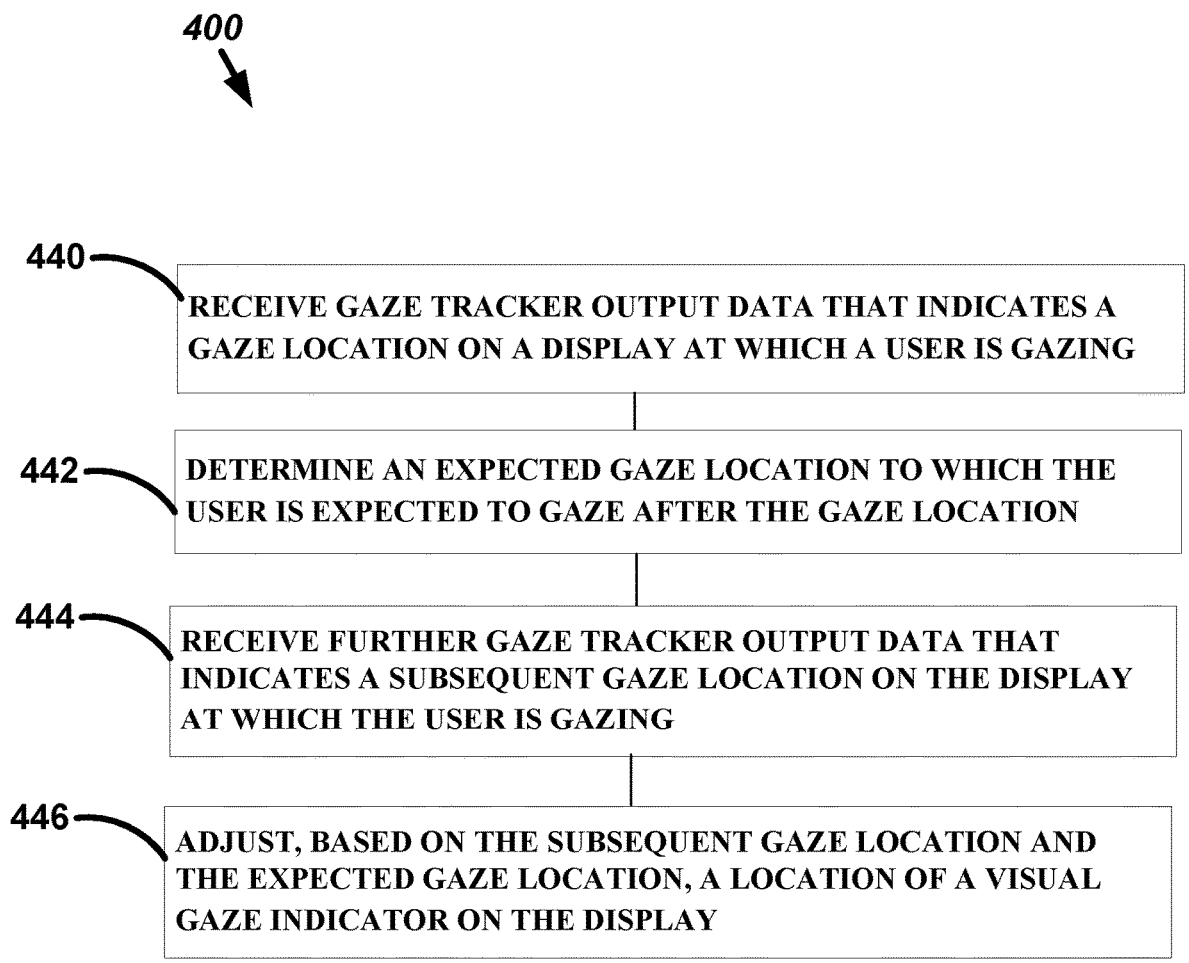
FIG. 4 illustrates, by way of example, a diagram of an embodiment of a method for calibration of a gaze indicator.

FIG. 4 illustrates, by way of example, a diagram of an embodiment of a method 400 for calibration of a gaze indicator. The method 400 as illustrated includes receiving gaze tracker output data that indicates a gaze location on a display at which a user is gazing, at operation 440; determining an expected gaze location to which the user is expected to gaze after the gaze location, at operation 442; receiving further gaze tracker output data that indicates a subsequent gaze location on the display at which the user is gazing, at operation 444; and adjusting, based on the subsequent gaze location and the expected gaze location, a location of a visual gaze indicator on the display, at operation 446.

The expected gaze location can be a range of pixels. The expected gaze location can be in an output display region of the display and the gaze location is in a virtual keyboard region of the display. The method 400 can further include receiving, from a text prediction model, a predicted next character. The expected gaze location can be at a location of a virtual button corresponding to the predicted next character in a virtual keyboard region of the display.

The method 400 can further include determining the gaze on the subsequent gaze location was sustained for a threshold amount of time. The adjusting can occur responsive to determining the gaze was sustained for the threshold amount of time.

The method 400 can further include responsive to determining the subsequent gaze location is within the expected dwell region (e.g., a specified number of pixels, such as 150 or fewer pixels, note the specified number can be dependent on pixel size and can be less for larger pixels and more for smaller pixels) and a typing speed is above a specified threshold characters per unit time (e.g., 4, 5, 6, 7 or a different number of characters per minute) decreasing a number of pixels in the range of pixels. The method 400 can further include responsive to determining the subsequent gaze location is not within the expected dwell region and the typing speed is below the specified characters per unit time, increasing the number of pixels in the range of pixels.

The proposed autocalibrated gaze trackers can improve the gaze typing experience by continuously adjusting the calibration in real-time based on gaze behavior, thereby reducing the need for manual recalibration and offering a more natural and efficient interaction. Autocalibrated gaze trackers benefit a wide range of users, including those with motor impairments who use gaze keyboards for everyday communication and others who use gaze typing systems for extended periods, such as gamers and virtual/augmented reality headset users.

Experimental Setup

An experimental setup consists of both hardware and software components to effectively evaluate the performance of the proposed autocalibrated gaze trackers with real users. An eye tracker tracked gaze data directed towards a screen that displayed an on-screen visual keyboard (FIG. 1). The autocalibration application facilitated the capture and processing of x, y coordinates from the eye tracker, providing necessary data for the autocalibration technique. The software for the autocalibration application received the 2D gaze coordinates in real-time. This allowed the autocalibration application to apply the necessary miscalibration corrections which could be displayed back on the visual keyboard application.

As discussed, a user can activate a key (i.e. type a character) on the visual keyboard by dwelling on it for a fixed duration of time. The autocalibration application has functionally similar to visual keyboards, however, it serves as a test bed with more control to process and update the miscalibrated gaze coordinates in real-time. A user's detected gaze location is displayed as an indicator on the screen. The user can direct their gaze at a desired character for typing. If they fixate on a key for a specified amount of time, a dwell timer is initiated by the system. If the user continues to look at the same key, the indicator can change size and, for example, decrease in area over time, eventually collapsing at the center of the key. Otherwise, the timer can be aborted and the user must fixate and dwell again to type any character subsequently. The dwell timer is a mechanism to ensure that a user is intentionally willing to type that specific character. After the timer is completed, the user receives visual feedback (the key turns red or some other indicator) that the character is typed on the text box at the top of the screen.

The autocalibration application can implement functionality of the following pseudocode:

---

Algorithm: Autocalibration for Eye Tracking During Gaze Typing

Require: Stream of gaze coordinates $(x_t, y_t)$ detected by an eye tracker; window size w for running average; detected calibration error bound b; calibration zone threshold $\tau$; y-coordinate for lower boundary of text box $y_{text\_box\_bottom}$
1: Initialize $\tau := \tau_{init}$ {threshold pixel distance of gaze coordinates from last typed character}
2: Initialize $n_{char} := 0$ {number of characters visible in text box}
3: Initialize $\epsilon_{x,0} = 0$, $\epsilon_{y,0} := 0$ {calibration error in x and y directions}
4: for raw gaze coordinates $(x_t, y_t)$: do
   5: Receive $n_{char}$ from typing application
   6: if $y < y_{text\_box\_bottom}$ and $n_{char} > 0$ then
   7: Receive location of last type character $(x_c, y_c)$ from typing application
   8: if fixation detected and $\sqrt{(x_c - x_t)^2 + (y_c - y_t)^2} < \tau$ then
     9: $\delta_{xt} := x_c - x_t$, $\delta_{yt} := y_c - y_t$ {infer user is reading at $(x_c, y_c)$}
     10: $\delta_{xt} := 1/\min(w,t) \sum_{j=\max(0,t-w+1)}^{n} \delta_{xj}$; $\delta_{yt} := 1/\min(w,t) \sum_{j=\max(0,t-w+1)}^{n} \delta_{yj}$
{sliding window estimate}
     11: $\epsilon_{xt} := \text{clip}(\delta_{xt}, -b, b)$, $\epsilon_{yt} := \text{clip}(\delta_{yt}, -b, b)$ {clip to maximum allowed offset}
   12: end if
   13: else
   14: $\epsilon_{xt} := \epsilon_{xt-1}$, $\epsilon_{yt} = \epsilon_{yt-1}$ {infer user is typing; keep current error calibration}
   15: end if
   16: return calibrated gaze coordinates $(\hat{x}_t, \hat{y}_t) := (x_t + \epsilon_{xt}, y_t + \epsilon_{yt})$
17: end for

---

Figure 5:
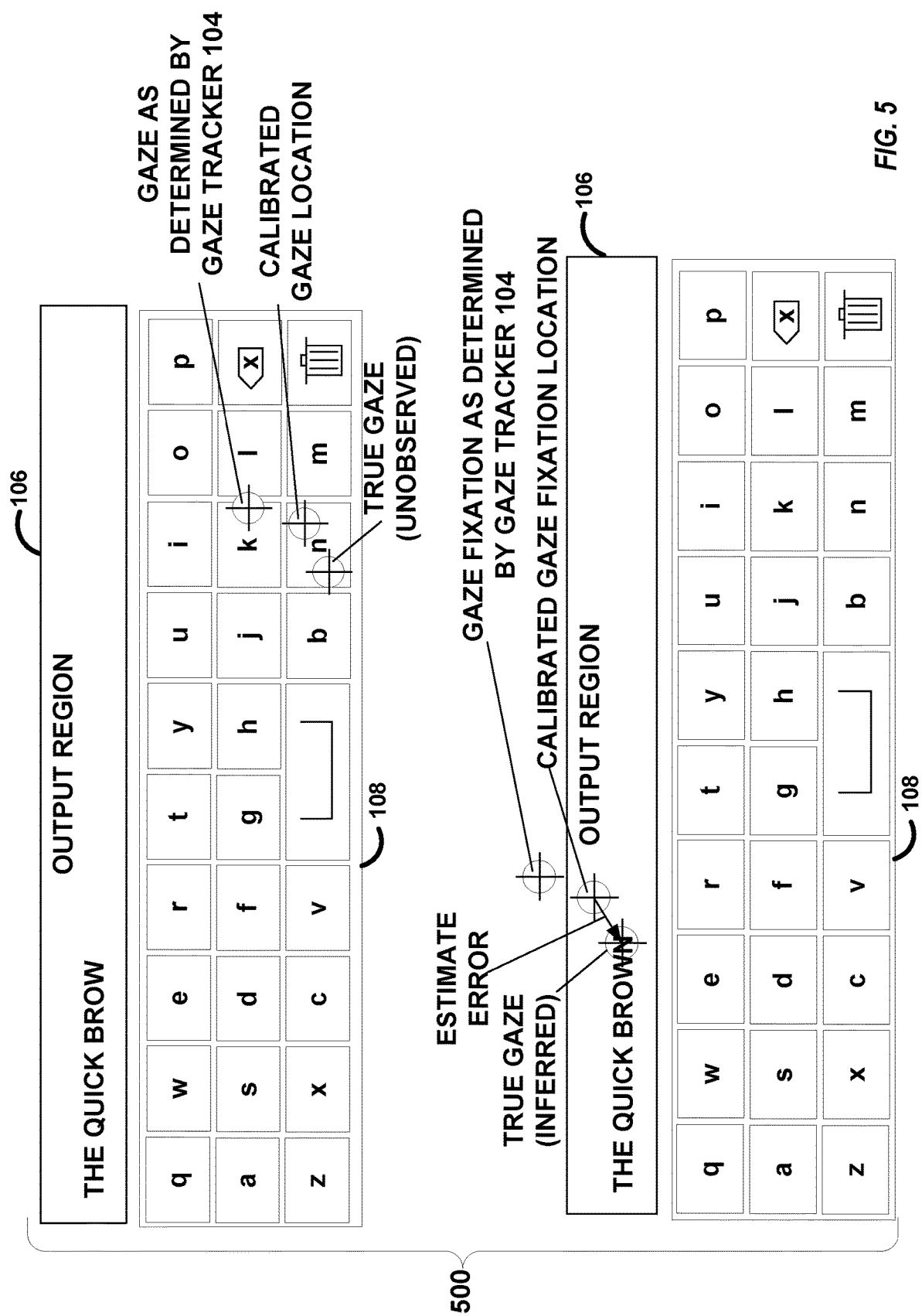
FIG. 5 illustrates, by way of example, a diagram of an embodiment of states for calibration of a gaze indicator.

FIG. 5 illustrates, by way of example, a diagram of an embodiment of a portion of the system 100 in two states 500 that helps explain the Algorithm. During typing, a gaze location $(x_t, y_t)$ is determined by the gaze tracker 104. An automatically calibrated gaze location $(\hat{x}_t, \hat{y}_t)$ is determined. The automatically calibrated gaze location in this instance is not exact. A true gaze location that is unobserved is illustrated. It can be a goal of automatic calibration to have the calibrated gaze location overlap with the true gaze location as much as possible.

During reading, a gaze fixation location $(x_t, y_t)$ is detected by the gaze tracker 104. A calibrated gaze fixation location is determined by calculating the error in calibration. A difference between the detected gaze fixation location and a true gaze location $(x_c, y_c)$ provides an estimation of error in the calibration. The true gaze location in the example of FIG. 5 is inferred to be a center of a symbol just typed ("N" in the example of FIG. 5) in region 106.

Current eye-gaze systems enable users to pause the task being performed with their gaze and manually recalibrate if they think their calibration is off. The autocalibrated gaze trackers herein provide an approach that automatically recalibrates while the person is typing without the need for manual recalibration, for a more seamless user experience.

The autocalibrated gaze tracker can assume the gaze is directed towards a text box when it falls above the keyboard region and within a certain threshold distance from a center of the text typed. The system can assume that the user reads the last typed character when they look up to read and detect the offset in calibration accordingly. Autocalibrated eye trackers can compute a moving average of the calibration offsets, which enables the calibration to be updated continuously and smoothly in real-time. Autocalibrated eye trackers can continuously update the calibration error based on the user's gaze behavior while reading the typed text. The correction to the detected miscalibration can continuously applied when the user's gaze moves away from the text box (i.e. while typing on the visual keyboard). The autocalibrated gaze coordinates can be displayed to the user with the updated location of the red gaze cursor on the screen. An example of the autocalibrated gaze tracker approach is detailed in the Algorithm.

User Study

To evaluate the effectiveness of the autocalibrated gaze tracker, an in-lab user study was performed. The effectiveness of the autocalibrated gaze tracker was compared to a standard manual calibration approach. Manual calibrations were performed via a standard calibration procedure. Participants typed a set of 5 phrases each in two gaze typing systems, but were not made aware of any differences between the two gaze typing systems.

19 participants with no prior experience in gaze typing were recruited. All participants were sighted (i.e. they did not need glasses, or their vision was correctable with glasses) and did not report any eye conditions. Two participants wore corrective eye glasses during their session.

Participants were initially introduced to gaze typing and given a brief tutorial on how to use the on-screen keyboard. The experiment consisted of an initial calibration procedure, a practice round, and two experimental phases: a static calibration phase and an autocalibrated phase (all described below in detail). The order of the static calibration and autocalibrated gaze typing phases was counterbalanced across participants. Users were free to abort a typing session if they found the setup too cumbersome to continue typing.

Initial Calibration and Practice Session

All participants first performed a manual calibration. Next, participants completed a practice round in which they typed two simple phrases ('hello there', 'happy new year') using the gaze typing application to familiarize themselves with the process.

Static Calibration System (No Learning)

In the static calibration phase, participants were asked to type 5 different phrases (1 per session) using the gaze typing system with the initial calibration settings. The phrases were randomly selected from a standard corpus to evaluate text entry systems, representing a diverse range of words and character combinations. At the start of each of the 5 sessions, the calibrated tracker was miscalibrated by a fixed amount of 0 or +75, -75 pixels in the x-direction, or +75, -75 pixels in the y-direction (counterbalanced order between sessions). These induced miscalibrations and affected the entire screen uniformly. After completing the set of 5 sessions, users provided feedback about their experience with the system.

Autocalibration System (Learning Interface)

In the autocalibrated gaze typing phase, participants first completed a manual calibration, and then used the autocalibrated gaze tracker to type the same set of predefined phrases. Participants were again asked to type 5 random predetermined phrases from the corpus, with similar induced miscalibration effects as the static calibration system. No two phrases were repeated across phases for the same participant or across sessions for different participants. After completing the set of 5 sessions, users provided feedback about their experience with the system.

Open Feedback

After typing sentences in both the static and autocalibrated phases (counterbalanced), participants shared open feedback in written form, and were also asked which of the two systems they preferred and why.

Metrics

To assess the effectiveness of the autocalibrated gaze typing technique, efficiency in terms of typing speed (characters per minute), number of backspaces, and abort frequency (number of incomplete sessions during which a user decided to give up typing a phrase) were compared as quantitative metrics. For qualitative feedback, responses and user preferences between the static calibration and the autocalibrated gaze typing systems, and open feedback, were collated. A two-sided t-test was performed to determine the significance of any observed differences.

Results

Performance of the autocalibration system (A: "EyeO") and static calibration system (B: Control) through the metrics. Qualitative findings observed through survey and interview responses are also provided.

Figure 6:
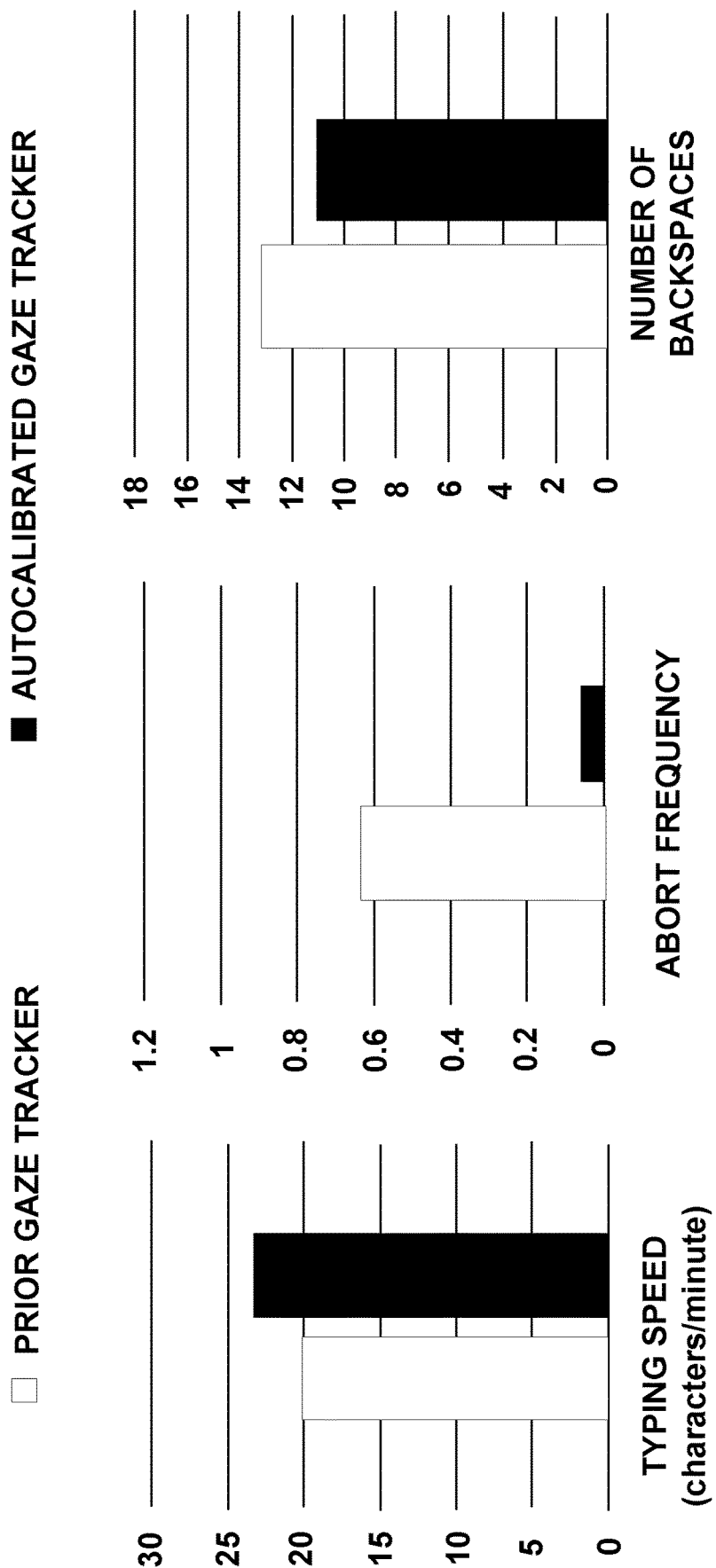
FIG. 6 illustrates, by way of example, respective graphs that quantify typing efficiency using a prior gaze tracker and the autocalibrated gaze tracker.

FIG. 6 illustrates, by way of example, respective graphs that quantify typing efficiency using a prior gaze tracker and the autocalibrated gaze tracker. The autocalibrated system, in the study, exhibited faster typing speeds (characters/minute), lower abort frequency (number of sessions aborted/total number of sessions), and requires lower number of backspaces to be used in comparison to the control. Differences between typing speed (EyeO: M=22.73, SE=0.78; Control: M=20.31, SE=0.65) and abort frequency (EyeO: M=0.05, SE=0.05; Control: M=0.6, SE=0.19) were statistically significant. Considering the gaze data for EyeO after the first reading attempt (when the system gets the first opportunity to autocalibrate), differences for typing speed (EyeO: M=25.91, SE=0.98; Control: M=20.31, SE=0.65; $p<0.001$) and number of backspaces used (EyeO: M=9.13, SE=2.0; Control: M=13.19, SE=2.12; $p=0.18$) were even larger. With this consideration, typing speed is strikingly different between the two systems ($p<0.001$), hinting towards the effectiveness of EyeO's autocalibration technique.

Mental Workload

Figure 7:
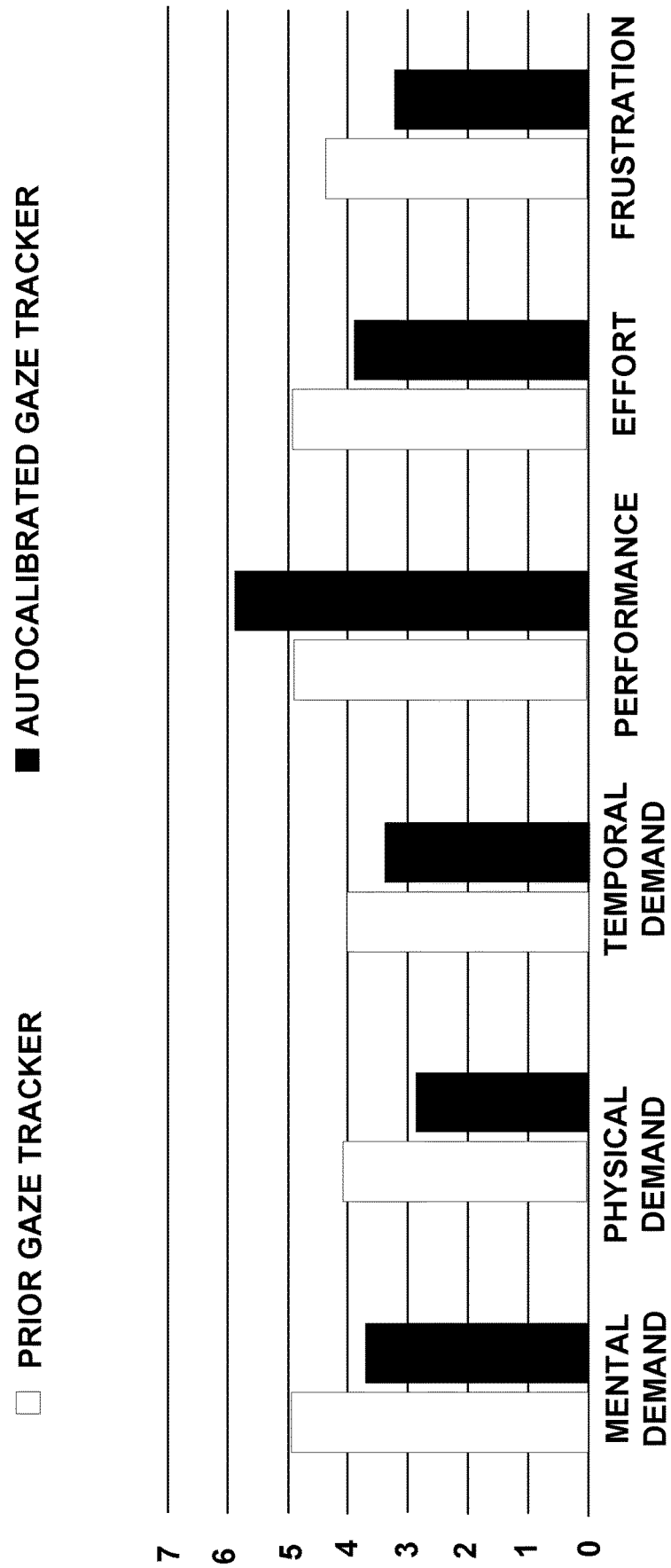
FIG. 7 illustrates, by way of example, respective graphs the quantify mental workload on a participant.

FIG. 7 illustrates, by way of example, respective graphs the quantify mental workload on a participant. In surveys, participants consistently rated the autocalibration system more favorably than the manual calibration of the control. Observe that along four of the six dimensions, differences between EyeO and the static control are statistically significant ($p<0.05$). Participants perceive reduced mental demand (EyeO: M=3.68, SE=0.36; Control: M=4.95, SE=0.35), improved performance (EyeO: M=5.84, SE=0.23; Control: M=4.89, SE=0.36), reduced effort (EyeO: M=3.84, SE=0.39; Control: M=4.95, SE=0.32), and reduced frustration (EyeO: M=3.10, SE=0.35; Control: M=4.37, SE=0.36). These results highlight an improved and more seamless user experience with autocalibration via EyeO compared to a static calibration approach. Qualitative feedback provides further support for these findings along the dimensions of mental comfort, performance, effort, and frustration. Note that several participants asked clarifying questions about the questions for physical demand and temporal demand. It is possible that the results for these two dimensions may reflect discrepancies in their interpretations.

Overall Preferences 14 out of the 20 participants preferred the autocalibrated system, 3 participants preferred the static calibration system, and 2 participants had no preference. While most users read the typed text, some users did not read at all and instead relied on the visual feedback from the interface (e.g., the visual key turning red when activated). Without looking at the text box to read the typed text, the autocalibrated system does not have an opportunity to update the calibration. Moreover, if the autocalibrated system is inaccurate in updating the gaze coordinates but corrects itself with more reading related signals, a user might prefer the reliability of errors in the static calibration system. Assuming other environmental factors to be constant, the miscalibration amount for a static system does not change in a session and thus users can learn to consistently compensate for it, albeit under cognitive strain.

Specifically, one user reports that for the autocalibrated system, "I would start off having to recognize the offset and type accordingly, but after a few characters it would adapt and then I could actually look at the intended character, so it got progressively easier". Another user states "I think [the autocalibrated system] is more comfortable. With [the manually calibrated system], I had to compensate for each word and found it harder to select the letter". Some users also noted challenges of using [the autocalibrated system] which only autocalibrates when a user reads a typed text (participants were unaware of this functionality): "Interface A was not easy to use, and required significant focus to complete, but I did not feel as strained while using it"; "It felt as if [the autocalibrated system] was adapting to the miscalibration in the eye tracker, whereas [the manual calibration] was not. The adaptability of [the autocalibrated system] has benefits and tradeoffs. It meant that [the manual calibration] was more predictable, whereas [the autocalibrated system] was less predictable. That said, there was perhaps less overall motor coordination effort involved in using [the autocalibrated system]".

Participants were asked why they preferred one system over the other, if at all. While one participant preferred the consistent miscalibration of the static system, several of them express the adaptability of the autocalibration system leads to a positive user experience: "I would prefer [the manual calibration]. The error or offset between where I gaze and the detected cursor seems constant in [the manual calibration]. In [the autocalibrated system], the error is more random."; "[the autocalibrated system] was on average easier and required less mental and physical load"; "[the autocalibrated system] adapted quickly to where I was looking". Additionally, one participant shared their personal thoughts about the potential of gaze typing technology and the need to improve the accuracy of calibration for deployment in real-world applications: "As someone who is open to alternatives means of typing due to physical restrictions, I like the potential of the technology but also acknowledge the potential strain for persons mentally and physically. It would be cool for persons typing on TVs though". One participant summarized the tradeoff between systems: "It felt as if [EyeO] was adapting to the miscalibration in the eye tracker, whereas [the control] was not. The adaptability of [EyeO] has benefits and tradeoffs. It meant that [the control] was more predictable, whereas [EyeO] was less predictable. That said, there was perhaps less overall motor coordination effort involved in using [EyeO]". The same user noted, "I think that overall I would prefer [EyeO] in the long-term."

Semi-Structured Interview with Stakeholders

To gain a better understanding of the potential usefulness of the autocalibration method for people with disabilities who use gaze typing, a semi-structured interview with stakeholders from the ALS community was conducted.

A single virtual semi-structured interview session with a group of ALS stakeholders, with institutional review board (IRB) approval, was conducted. The session included (1) a demonstration of EyeO and (2) a guided group discussion. The group discussion centered around participants' relationship with the ALS community and gaze typing, barriers to gaze typing technologies for ALS users, resources to assist ALS users during gaze typing, and feedback on the demoed EyeO prototype.

Three primary themes were derived from the semi-structured interview questions and any additional content covered during the interview. Each primary theme was subdivided into multiple secondary themes. A transcript was categorized sentence-by-sentence into one or more secondary codes, if applicable.

Participants 7 participants from support organizations for ALS were recruited. Two of the participants were direct caregivers for family members who have/had ALS, three were members of organizations which support people with ALS, and one was a speech pathologist who treats ALS clients in the states of Washington, New Jersey, and Maryland in the United States.

One of the participants had 20 years of experience in software and hardware development, with a focus on accessibility programming and building eye trackers. Another participant has 40 years of software development experience and got involved in the ALS association 18 years ago, building software for missing pieces of eye tracking to make them do things they were not programmed or capable of doing at the time. In addition, a participant with cerebral palsy who used eye trackers for gaze typing in her daily life participated.

In the ALS community, caregivers are heavily relied on for setting up and using gaze tracking or other assistive devices. In particular, support staff who specialize in assistive devices and care for people with ALS have a wealth of experience from working with many individuals, and it wan an aim to learn from their broad experience with many people.

Resulting Themes

Findings from the semi-structured interview categorized by the three identified primary themes and their subsequent secondary themes.

Obstacles to Eye-Gaze Typing. Participants discussed various obstacles ALS users face in using eye tracker for gaze typing, which is an essential form of communication.

Medications: Participants noted that during the progression of ALS, people ingest stronger doses of medications such as muscle relaxants, anti-allergens, and opioids to manage symptoms and discomfort. Each of these three categories of medications creates problems for gaze-based interaction. Muscle relaxants make it harder to focus on a precise location on the screen; anti-allergens cause eye dryness which induces blinking, thereby diminishing eye tracking quality; and opioids cause pupil constrictions and dilations, making it harder to track the eyes. These issues could also create autocalibration problems for users with progressed disease.

Eye Function: Participants noted that glasses often diminish eye tracking quality as they reflect both external light sources and the screen itself. Thus, many people with ALS do not wear glasses during gaze typing.

Additionally, towards later stages of the disease, one side of the body often tightens, causing the head to drop and rotate to one side and making eye tracking more difficult. As a result, in later phases of the disease, only one eye will be used for tracking. Most modern eye trackers can reliably detect gaze by tracking only one eye.

Changing Positions: Participants shared that people with ALS often move out of their chair or have their screens removed for medical care. Every time they return, they must recalibrate their eye tracker. They suggested that autocalibration could benefit such users returning to their device after intermissions without having to recalibrate each time. One participant explained, "When tracking errors are position specific . . . an autocalibration algorithm that was the right one, that would be very useful and would operationalize eye trackers properly."

Calibration Process: Participants shared that ALS users often adapt and find workarounds for calibration drift, excelling at compensating for miscalibrations. One care worker explained, "Some of their brain muscle memory has already developed like they know how they can be so off and all of a sudden they shoot to the right character and get it. And it's because they've learned how to adapt to that."

Recalibration Frequency: Participants explained that ALS users often recalibrate as much as 50 times a day, in an attempt to fix poor tracking. This causes frustration and can discourage use of the device at all. "It's annoying to them and they need to calibrate again and again'; ' . . . they'll need to have 20 calibrations in a 2 hour period. Well, there's no solution other than recalibrating. So like this would be amazing, them having the ability to have that autocalibration."

Resources for Eye-Gaze Typing. Participants discussed resources that help alleviate obstacles to gaze typing for people with ALS.

Human debugging: Participants noted that gaze typing can cause fatigue and overwhelm ALS users new to the system. Keyboard layouts are modified over time with additional features or buttons to help them use the device for longer and make the learning curve easier. In debugging, feedback from calibration (e.g. patterns in mistakes across the calibration targets) is a tool that care givers use. For example, such feedback can indicate that the device positioning is off, or that lighting from a window is interfering with tracking "There are so many situations where you need someone to figure out what you see from the calibration".

Education and training: Participants noted that there is a lack of awareness and education about using eye tracking technology effectively with ALS. For example, they noted that education about the impacts of medications could significantly advance eye tracking efficacy.

Prototype Feedback. Finally, participants shared their perspectives on the demoed prototype's potential, pitfalls and suggested future improvements for ALS users.

Use Cases: Participants found EyeO to be promising for ALS users, and were interested in ALS users having the opportunity to use the system. "We would definitely try it with our clients 100%." In particular, they thought that EyeO's autocalibration could help alleviate the frustration around repeated calibration. "It would be amazing for them to have the ability for autocalibration." They also recognized the potential for EyeO to reduce the learning curve for new users and improve communication during the progression of ALS. "The trackers work really well on some [people] and then they get towards the more progressed stage of the disease, towards the end of life, and then that's when a lot of the times things get complex with medications. So I'm just really happy to see anything that could help get somebody started on eye gaze, because a lot of people start too late."; "For someone who's starting off and they have a significant offset, this would be very, very significant."

Desired Improvements: Participants noted that for people in later stages of ALS or people who are otherwise unable to dwell on a precise location, having larger keys areas and fonts could help increase the error tolerance of the algorithm and still prove helpful. They suggested that specific keys could further enhance autocalibration—for example, the spacebar could serve as an indicator that the previous word was typed correctly, or typing the next likely character successfully could be used as a point of calibration. They also suggested that alternate sensory feedback during calibration such as audio could increase transparency and enhance the user experience by letting the user know that the calibration is changing. "I think even being able to alert the user to what has changed specifically before and after autocalibration would be really important." They also noted that logs or reports generated during autocalibration could be useful for caregivers debugging the system and for physicians diagnosing other medical conditions like cataracts or medication effects.

Pitfalls: Participants reiterated that people using medications which cause dry eyes or pupil dilations might not benefit as much from autocalibration because their main challenge with gaze typing is the inability to focus or the eyes not being detected by the eye trackers.

Discussion

Autocalibrating eye trackers, without introducing additional tasks for the end user, represents a step towards building more seamless user experiences. Gaze data offers vast potential as a form of computer interaction, effectively making technology more accessible and user-friendly. Coupled with methods for autocalibration, an array of seamless gaze-controlled interactions may become possible.

Figure 8:
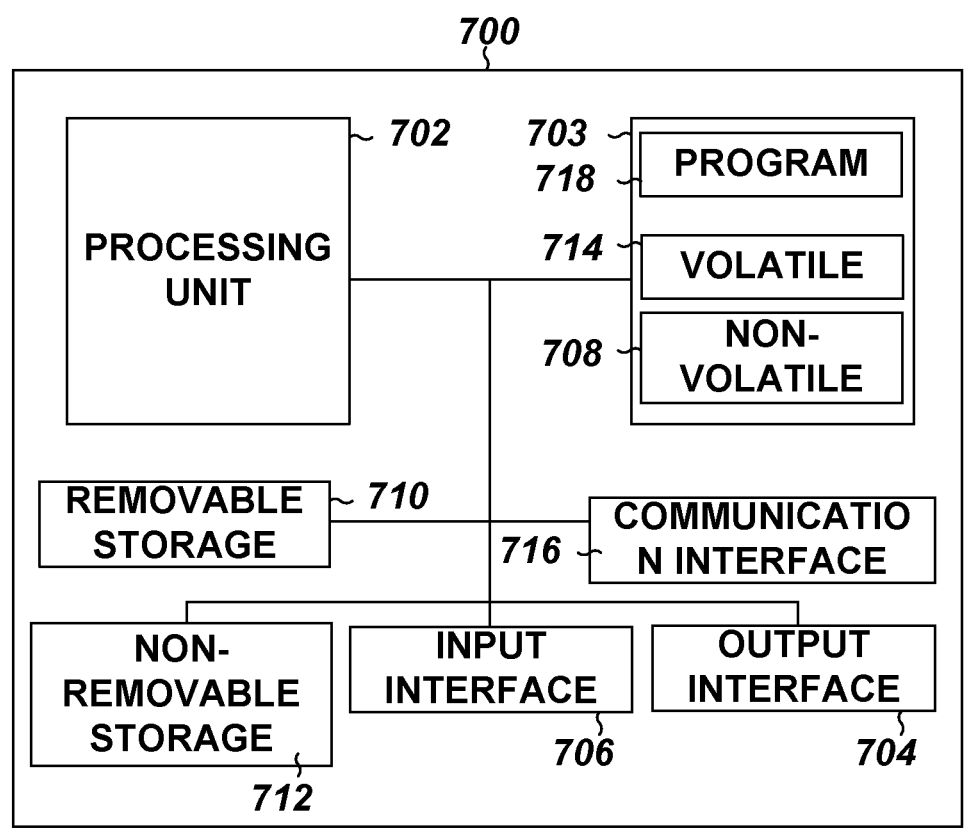
FIG. 8 illustrates, by way of example, a block diagram of an embodiment of a machine (e.g., a computer system) to implement one or more embodiments.

FIG. 8 illustrates, by way of example, a block diagram of an embodiment of a machine 700 (e.g., a computer system) to implement one or more embodiments. The computer 118, gaze tracker 104, or the display 102, autocalibration application 334, predictive text engine 330, or the like, can include one or more of the components of the machine 700. One or more of the computer 118, gaze tracker 104, display 102, autocalibration application 334, predictive text engine 330, or method 400 or a component or operations thereof can be implemented, at least in part, using a component of the machine 700. One example machine 700 (in the form of a computer), may include a processing unit 702, memory 703, removable storage 710, and non-removable storage 712. Although the example computing device is illustrated and described as machine 700, the computing device may be in different forms in different embodiments. For example, the computing device may instead be a smartphone, a tablet, smartwatch, or other computing device including the same or similar elements as illustrated and described regarding FIG. 8. Devices such as smartphones, tablets, and smartwatches are generally collectively referred to as mobile devices. Further, although the various data storage elements are illustrated as part of the machine 700, the storage may also or alternatively include cloud-based storage accessible via a network, such as the Internet.

Memory 703 may include volatile memory 714 and non-volatile memory 708. The machine 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 700 may include or have access to a computing environment that includes input 706, output 704, and a communication connection 716. Output 704 may include a display device, such as a touchscreen, that also may serve as an input component. The input 706 may include one or more of a touchscreen, touchpad, mouse, keyboard, camera, one or more device-specific buttons, one or more sensors integrated within or coupled via wired or wireless data connections to the machine 700, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 702 (sometimes called processing circuitry) of the machine 700. A hard drive, CD-ROM, and RAM are some examples of articles including a non-transitory computer-readable medium such as a storage device. For example, a computer program 418 may be used to cause processing unit 702 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

ADDITIONAL NOTES AND EXAMPLES

Example 1 includes a method comprising receiving gaze tracker output data that indicates a gaze location on a display at which a user is gazing, determining an expected dwell region to which the user is expected to gaze after the gaze location, receiving further gaze tracker output data that indicates a subsequent gaze location on the display at which the user is gazing, and calibrating, based on the subsequent gaze location and the expected dwell region, a location of a visual gaze indicator on the display resulting in a calibrated visual gaze indicator.

In Example 2, Example 1 further includes, wherein the expected dwell region is a range of pixels.

In Example 3, Example 2 further includes responsive to determining the subsequent gaze location is within the expected dwell region and a typing speed is above a specified threshold characters per unit time decreasing a number of pixels in the range of pixels.

In Example 4, at least one of Examples 2-3 further includes responsive to determining the subsequent gaze location is not within the expected dwell region and a typing speed is less than a specified threshold characters per unit time increasing the number of pixels in the range of pixels.

In Example 5, at least one of Examples 1-4 further includes, wherein the gaze location is a pixel.

In Example 6, at least one of Examples 1-5 further includes, wherein the expected dwell region is in an output display region of the display and the gaze location is in a virtual keyboard region of the display.

In Example 7, Example 6 further includes receiving, from a predictive text engine, a predicted next character, and wherein the expected dwell region is at a location of a virtual button corresponding to the predicted next character in a virtual keyboard region of the display.

In Example 8, Example 7 further includes, wherein receiving, from the predictive engine, further includes receiving a confidence associated with the predicted next character and the expected dwell region is at the location of the virtual button corresponding to the predicted next character only if the confidence is greater than a specified threshold.

In Example 9, at least one of Examples 1-8 further includes determining the gaze on the subsequent gaze location is sustained for a threshold amount of time, and wherein the calibrating occurs responsive to determining the gaze on the subsequent gaze location is sustained for the threshold amount of time.

Example 10 includes a system configured to perform at least one of Examples 1-9.

Example 11 includes a machine-readable medium including instructions that, when executed by a machine, cause the machine to perform operations of the method of at least one of Examples 1-10.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
   receiving, by processing circuitry and from a gaze tracker, gaze tracker output data that indicates a gaze location on a display at which a user is gazing, the gaze location indicating a pixel of a display;
   determining, by the processing circuitry, an expected dwell region to which the user is expected to gaze after the gaze location, the expected dwell region is a range of pixels;
   receiving, by the processing circuitry and from the gaze tracker, further gaze tracker output data that indicates a subsequent gaze location on the display at which the user is gazing; and
   calibrating, by the processing circuitry and based on the subsequent gaze location and the expected dwell region, a location of a visual gaze indicator on the display resulting in a calibrated visual gaze indicator.

2. The method of claim 1, further comprising responsive to determining the subsequent gaze location is within the expected dwell region and a typing speed is above a specified threshold characters per unit time decreasing a number of pixels in the range of pixels.

3. The method of claim 1, further comprising responsive to determining the subsequent gaze location is not within the expected dwell region and a typing speed is less than a specified threshold characters per unit time increasing a number of pixels in the range of pixels.

4. The method of claim 1, wherein the gaze location is a pixel.

5. The method of claim 1, wherein the expected dwell region is in an output display region of the display and the gaze location is in a virtual keyboard region of the display.

6. The method of claim 5, further comprising:
   receiving, from a predictive text engine, a predicted next character; and
   wherein the expected dwell region is at a location of a virtual button corresponding to the predicted next character in a virtual keyboard region of the display.

7. The method of claim 6, wherein receiving, from the predictive engine, further includes receiving a confidence associated with the predicted next character and the expected dwell region is at the location of the virtual button corresponding to the predicted next character only if the confidence is greater than a specified threshold.

8. The method of claim 1, further comprising:
   determining the gaze on the subsequent gaze location is sustained for a threshold amount of time; and
   wherein the calibrating occurs responsive to determining the gaze on the subsequent gaze location is sustained for the threshold amount of time.

9. A system comprising:
   a display device;
   a gaze tracker configured to generate output data that indicates a gaze location on the display at which a user is gazing;
   a user interface that causes a virtual keyboard and an output display region to be displayed concurrently on the display device; and processing circuitry that executes an autocalibration application to:

receive the output data;

determine an expected dwell region to which the user is expected to gaze after the gaze location, the expected dwell region is a range of pixels on the display device;

receive further output data from the gaze tracker that indicates a subsequent gaze location on the display at which the user is gazing; and calibrate, based on the further output data and the expected dwell region, a location of a visual gaze indicator provided by the user interface on the display resulting in a calibrated visual gaze indicator.

10. The system of claim 9, wherein executing the autocalibration application further causes the processing circuitry to:

determine the gaze on the subsequent gaze location is sustained for a threshold amount of time; and wherein the calibrating occurs responsive to determining the gaze on the subsequent gaze location is sustained for the threshold amount of time.

11. The system of claim 9 further comprising:

a predictive text engine configured to generate a predicted next character; and wherein executing the autocalibration application further causes the processing circuitry to:

receive the predicted next character; and wherein the expected dwell region is at a location of a virtual button corresponding to the predicted next character in a virtual keyboard region of the display.

12. The system of claim 9, wherein the expected dwell region is in the output display region of the display and the gaze location is in the virtual keyboard region of the display.

13. The system of claim 9, wherein the autocalibration application is further configured to, responsive to determining the subsequent gaze location is within the expected dwell region, decreasing a number of pixels in the range of pixels.

14. The system of claim 9, wherein executing the autocalibration application further causes the processing circuitry to, responsive to determining the subsequent gaze location is not within the expected dwell region increasing a number of pixels in the range of pixels covered by the expected dwell region.

15. A non-transitory machine-readable medium including instructions that, when executed by a machine, cause the machine to perform operations comprising:

determining an expected dwell region to which a user is expected to gaze after a current gaze location, the current gaze location on a virtual keyboard region of a display, the expected dwell region is a range of pixels on the display;

receiving gaze tracker output data that indicates a subsequent gaze location on the display at which the user is gazing; and calibrating, based on the output data and the expected dwell region, a location that a visual gaze indicator is to be displayed on a display resulting in a calibrated visual gaze indicator.

16. The non-transitory machine-readable medium of claim 15, wherein the operations further comprise:

determining the gaze on the subsequent gaze location is sustained for a threshold amount of time; and wherein the calibrating occurs responsive to determining the gaze on the subsequent gaze location is sustained for the threshold amount of time.

17. The non-transitory machine-readable medium of claim 15, wherein the expected dwell region is in an output display region of the display.

18. The non-transitory machine-readable medium of claim 15, wherein the operations further comprise:

receiving, from a predictive text engine, a predicted next character and a confidence associated with the predicted next character; and wherein the expected dwell region is at a location of a virtual button corresponding to the predicted next character in a virtual keyboard region of the display only if the confidence is greater than a specified threshold.

19. The non-transitory machine-readable medium of claim 15, wherein the operations further comprise:

responsive to determining the subsequent gaze location is within the expected dwell region decreasing a number of pixels in the range of pixels covered by the expected dwell region; or responsive to determining the subsequent gaze location is not within the expected dwell region increasing the number of pixels in the range of pixels covered by the expected dwell region.

* * * * *